(12) United States Patent
Piehler et al.

(10) Patent No.: US 10,488,250 B2
(45) Date of Patent: Nov. 26, 2019

(54) METHOD AND DEVICE FOR QUANTITATIVELY SENSING THE POWER FRACTION OF A RADIATION BACKGROUND OF A PULSED LASER

(71) Applicant: Universität Stuttgart, Stuttgart (DE)

(72) Inventors: Stefan Piehler, Stuttgart (DE); Benjamin Dannecker, Stuttgart (DE); Jan Philipp Negel, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 0 days.

(21) Appl. No.: 15/558,750

(22) PCT Filed: Mar. 16, 2016

(86) PCT No.: PCT/EP2016/000474
§ 371 (c)(1),
(2) Date: Sep. 15, 2017

(87) PCT Pub. No.: WO2016/146263
PCT Pub. Date: Sep. 22, 2016

(65) Prior Publication Data
US 2018/0066983 A1 Mar. 8, 2018

(30) Foreign Application Priority Data
Mar. 16, 2015 (DE) .................. 10 2015 003 370

(51) Int. Cl.
*G01J 1/04* (2006.01)
*G01J 1/42* (2006.01)
(Continued)

(52) U.S. Cl.
CPC .......... *G01J 1/0411* (2013.01); *G01J 1/0407* (2013.01); *G01J 1/0414* (2013.01); *G01J 1/4257* (2013.01);
(Continued)

(58) Field of Classification Search
CPC ...... G01J 1/0411; G01J 1/0407; G01J 1/0414; H01S 3/0014; H01S 3/067; H01S 3/1305; H01S 2301/085
See application file for complete search history.

(56) References Cited

U.S. PATENT DOCUMENTS

2006/0029110 A1* 2/2006 Cho .................. H01S 3/067
372/6
2006/0198399 A1* 9/2006 Jablonski ............... B82Y 10/00
372/10
(Continued)

OTHER PUBLICATIONS

PCT (CN) International Search Report, Application No. PCT/EP2016/000474, dated Jul. 18, 2016, 11 pgs.

*Primary Examiner* — Dominic J Bologna
(74) *Attorney, Agent, or Firm* — Armstrong Teasdale LLP

(57) ABSTRACT

The present disclosure provides a method and to a device for quantitatively sensing the power fraction of a radiation background of a pulsed laser. The disclosure further relates to the use of a saturable element. The method includes modulating a measurement beam, which is emitted by the laser, by means of a saturable element in accordance with the fluence of the measurement beam, detecting, by means of a modulation beam power detector, the power of the measurement beam modulated by the saturable element, and determining the power fraction of the radiation background of the pulsed laser on the basis of the detected power of the measurement beam modulated by means of the saturable element.

20 Claims, 4 Drawing Sheets

(51) Int. Cl.
*H01S 3/00* (2006.01)
*H01S 3/067* (2006.01)
*H01S 3/13* (2006.01)

(52) U.S. Cl.
CPC .......... *H01S 3/0014* (2013.01); *H01S 3/067* (2013.01); *H01S 3/1305* (2013.01); *H01S 2301/085* (2013.01)

(56) References Cited

U.S. PATENT DOCUMENTS

| | | | |
|---|---|---|---|
| 2008/0225386 A1* | 9/2008 | Leitner | H01S 3/0604 359/348 |
| 2009/0034564 A1* | 2/2009 | Lederer | G01J 11/00 372/25 |
| 2012/0039344 A1* | 2/2012 | Kian | H01S 3/1118 372/6 |
| 2014/0313513 A1* | 10/2014 | Liao | G01J 1/4257 356/445 |
| 2015/0155681 A1* | 6/2015 | Ozyilmaz | H01S 3/06791 372/6 |
| 2015/0253199 A1* | 9/2015 | Sartorius | G01J 11/00 250/341.3 |
| 2016/0294149 A1* | 10/2016 | Vasilyev | H01S 3/0612 |
| 2016/0334285 A1* | 11/2016 | Celikel | G01J 1/0448 |

* cited by examiner

METHOD AND DEVICE FOR QUANTITATIVELY SENSING THE POWER FRACTION OF A RADIATION BACKGROUND OF A PULSED LASER

CROSS REFERENCE TO RELATED APPLICATIONS

This application is a National Stage Entry of PCT/EP2016/000474 filed Mar. 16, 2016, which claims priority to DE Patent Application No. 10 2015 003 370.0 filed Mar. 16, 2015, both of which are incorporated herein by reference in their entirety.

BACKGROUND

The invention relates to a method and to a device for quantitatively detecting the power proportion of a radiation background of a pulsed laser. The invention further relates to the use of a saturable element.

A quantification of the radiation background, in particular of the so-called continuous wave (cw) background, of a pulsed laser or laser system is of great interest both to material processors as well as to laser developers. For example, with precise knowledge of the radiation background, adverse influences of the radiation background on machining processes can be selectively examined. Also in the development of pulsed laser systems, particularly in ultra-short pulsed laser systems, is the quantitative proportion of the radiation background of great interest.

So far, the radiation background or cw background can only be inferred indirectly depending on the operating mode of the laser. In a passive mode-locked laser oscillator, it is possible to draw qualitative conclusions on the operating mode based on the spectrum, for example, i.e. it is possible to determine whether a pure pulsed operation is present or whether there is a cw ground in addition. A quantitative assessment of the power proportion of the cw background or the power ratio between pulsed proportion and cw proportion is, however, only feasible and practicable with severe limitations.

For a quantitative measurement, e.g. a photodiode could be used and the power proportion could be determined both during the pulses and in the period between the pulses by integration of the diode signal. However, this requires an extremely high dynamic range of the photodiode due to the high power of the laser radiation during the pulses and the short duration of the pulses, so that this method proves to be impracticable. Furthermore, any offsets and external light sources would cause a very large error. In addition, this method cannot be used in ultra-short pulses, since due to the limited response or decay time of the diodes a resolution of the individual pulses is no possible any more, and thus a ground actually not present would be measured by superposition of several pulses during the measurement time.

Another possible method of determining the radiation background of a pulsed laser or laser system is frequency doubling, the efficiency of which is dependent on the proportion of the pulsed power to the total power. However, the components required are expensive and the measurement is inaccurate, as several unknown parameters are included in the conversion efficiency.

The present disclosure therefore provides a device and a method for quantitatively detecting the power proportion of the radiation background or cw background of pulsed lasers or laser systems.

BRIEF DESCRIPTION

The present disclosure provides a method for quantitatively detecting or measuring the power proportion of a radiation background of a pulsed laser, including the steps of modulating a measurement beam emitted by the laser by means of a saturable element depending on the fluence of the measurement beam, detecting or measuring the power of the measurement beam modulated by the saturable element by means of a modulation beam power detector, and determining or calculating the power proportion of the radiation background of the pulsed laser on the basis of the detected power of the measurement beam modulated by the saturable element.

The term "power proportion" can refer to the proportion of the mean pulse power or to the proportion of the cw background to the total power. In particular, the ratio of the power of the radiation background to the pulse power of the laser can be detected or measured with the inventive method and the device according to the invention described below.

The term "laser" as defined in this description is a laser source and/or a laser system. In particular, a laser source comprises an oscillator and, optionally, an amplifier.

"Radiation background of a pulsed laser" in particular means the so-called continuous wave (cw) background of the laser or the laser radiation, i.e. a continuous or permanent and substantially constant radiation of the laser. However, the radiation background may also include other temporally non-constant signals, such as subsidiary pulses, which may arise due to reflections in the beam guidance or instabilities in the pulsed laser.

A "saturable element" is an element having e.g. a saturable absorption or a saturable reflectivity or a saturable transmission. A saturable element is characterized by an intensity-dependent or fluence-dependent retroactive effect of the saturable element on an incoming or incident light or laser beam. For example, a saturable element is characterized by an intensity- or fluence-dependent transmission, absorption, reflection, diffraction and/or scattering. Here, the saturable element is in particular characterized by a modulation depth ΔR and by non-saturable losses ΔRns resulting from the fluence-dependent transmission, absorption, reflection, diffraction and/or scattering. The properties of a saturable element, i.e. in particular the fluence-dependent transmission, absorption, reflection, diffraction and/or scattering, or the modulation depth ΔR and the non-saturable losses ΔRns may be known from or specified by the manufacturer or may be determined experimentally by calibration or characterization, for example. Advantageously, the saturable element has the highest possible modulation depth, for example a modulation depth greater than 0.05, more particularly greater than 0.1, and even more particularly greater than 0.3. Advantageously, the saturable element has the lowest possible non-saturable losses, for example less than 0.1, more particularly less than 0.05, and even more particularly less than 0.03, For example, a semiconductor absorber, a graphene absorber, or doped crystals can be used as the saturable element. Semiconductor absorbers, graphene absorbers, or doped crystals may function as a transmissive element. However, a semiconductor absorber may also be realized as a reflective element, particularly as a saturable mirror, together with a Bragg reflector.

"Modulating a laser beam" as defined in this description means transmitting, absorbing, reflecting, diffracting and/or scattering the laser beam. Due to the interaction of a laser beam with the saturable element, in particular the power of the laser beam is modified or modulated. Thus, the term "modulating" in particular comprises a power modulation. The modulation of a light or laser beam effected by the saturable element is dependent on the fluence of the laser beam, which occurs or is present upon incidence of the laser beam on the saturable element. In other words, the modulation of a light or laser beam effected by the saturable element is dependent on the fluence of the laser incident on the saturable element. Thus, the modulation is performed depending on the fluence of the measurement beam incident on the saturable element.

"Fluence" means the energy per area. If a laser beam or laser pulse encounters a saturable element or is incident on a saturable element, the fluence is the energy of the laser beam or laser pulse which acts on the saturable element per unit area.

A "measurement beam" as defined in this description is a laser beam or laser pulse that impinges or is incident on the saturable element, i.e. that interacts with the saturable element and thus is modulated by the saturable element.

The power proportion of the radiation background of the pulsed laser is determined or calculated on the basis of the detected power of the measurement beam modulated by the saturable element. In particular, the power proportion of the radiation background of the pulsed laser can be determined with the following equation:

$$\frac{P_{cw}}{P_{puls}} = \frac{(1 - \Delta R_{ns}) - \frac{P_{Sat}}{P_{Ref}}}{\frac{P_{Sat}}{P_{Ref}} - (1 - \Delta R_{ns} - \Delta R)}, \quad (1)$$

where $P_{cw}$ is the power of background radiation or the cw radiation and $P_{puls}$ is the mean pulse power of the laser beam or measurement beam. As mentioned above, $\Delta R$ represents the modulation depth of the saturable element, and $\Delta R_{ns}$ represents the non-saturable losses of the saturable element. $P_{Ref}$ is the power of a reference beam of the laser and corresponds to the total power of the laser or laser beam. The total power of the laser and thus $P_{Ref}$ is known from the manufacturer of the laser or can be determined experimentally. $P_{Ref}$ is the sum of $P_{cw}$ and $P_{puls}$. With known characteristics of the saturable element, i.e. with a known modulation depth and known non-saturable losses of the saturable element, $P_{Sat}$ is the only unknown variable on the right side of equation (1). $P_{Sat}$ designates the power of the laser beam or measurement beam modulated by the saturable element. By detecting or measuring this power $P_{Sat}$, the ratio of $P_{cw}$ and $P_{puls}$ and thus the power proportion of the background radiation of the laser can be determined or calculated.

Advantageously, the method according to the disclosure allows a very simple quantitative detection or measurement of the power proportion of the radiation background both on newly developed pulsed laser systems and on pulsed laser systems already industrially applied.

In one embodiment, prior to the step of modulating the measurement beam, the method includes splitting a laser beam emitted by the laser into a reference beam and the measurement beam by means of a beam splitter.

Furthermore, prior to the step of determining the power proportion of the radiation background of the pulsed laser, the method includes detecting or measuring the power of the reference beam by means of a reference beam power detector.

The reference beam may also be referred to as a first partial beam of the laser beam emitted by the laser. Accordingly, the measurement beam may be referred to as a second partial beam of the laser beam emitted by the laser.

The beam splitter splits the laser beam emitted by the laser into the reference beam and the measurement beam with a specific or defined split ratio. The split ratio of the beam splitter may be known or determined or determinable experimentally.

By means of the beam splitter, the power of the reference beam included in equation (1), i.e. the total power of the laser beam emitted by the laser, can be determined experimentally. Thus, advantageously, the total power of the laser or laser beam to be analyzed need not be known. In addition, the measurement can be made independent of variations of the total power of the laser.

With the use of the beam splitter, the power proportion of the radiation background of the pulsed laser can be determined with the following equation:

$$\frac{P_{cw}}{P_{puls}} = \frac{(1-S)(1 - \Delta R_{ns}) - \frac{P_{Sat}}{P_{Ref}}}{\frac{P_{Sat}}{P_{Ref}} - (1-S)(1 - \Delta R_{ns} - \Delta R)}. \quad (2)$$

Here, S designates the reflectivity of the beam splitter or the proportion of the incident power, which is reflected at the beam splitter.

In a further embodiment, prior to the step of detecting the power of the modulated measurement beam, the method includes the following step: adjusting the fluence of the measurement beam occurring at the saturable element by means of a fluence adjusting element such that the saturable element is in an unsaturated state as a consequence of the radiation background of the measurement beam, and in a saturated state as a consequence of a pulse of the measurement beam.

In other words, the fluence of the measurement beam occurring or present at the saturable element is adjusted by means of a fluence adjusting element such that the saturable element is unsaturated in case of a fluence resulting from the radiation background of the measurement beam, i.e. as a consequence of the radiation background of the laser or measurement beam impinging on the saturable element, and is saturated in case of a fluence resulting from a pulse of the measurement beam, i.e. as a consequence of a pulse or the pulse radiation of the laser or measurement beam impinging on the saturable element.

An unsaturated state may be present when a degree of modulation achieved by the saturable element, in particular a reflectivity or transmissivity of the laser beam or measurement beam, is below or above (depending on the nature of the saturable element) a predetermined first threshold value. Accordingly, a saturated state may be present when the degree of modulation of the saturable element is above and below a predetermined second threshold value. The predetermined first and second threshold values may depend on the respective saturable element or on the type of the respective saturable element. The first threshold value may be different from the second threshold value. However, it is also possible that the first and second threshold values are equal. For example, the first and the second threshold values may correspond to a turning point of the fluence curve (i.e. the curve representing the modulation degree as a function of fluence).

The fluence of the measurement beam occurring or present at the saturable element may be adjusted by means of a fluence adjusting element such that the saturable element is substantially fully unsaturated in case of a fluence resulting from the radiation background of the measurement beam, i.e. as a consequence of the radiation background of the laser or measurement beam impinging on the saturable element, and is substantially fully saturated in case of a fluence resulting from a pulse of the measurement beam, i.e. as a consequence of a pulse or the pulse radiation of the laser or measurement beam impinging on the saturable element.

The saturable element may be fully saturated or be in a fully saturated state when the fluence impinging or incident on the saturable element has a value at which the modulation, i.e. transmission, absorption, reflection, diffraction and/or scattering of the laser beam or measurement beam caused by the saturable element has a saturation extreme value, i.e. a maximum or a minimum. Accordingly, the saturable element may be fully unsaturated or be in a fully unsaturated state when the fluence impinging or incident on the saturable element has a value at which the modulation, i.e. transmission, absorption, reflection, diffraction and/or scattering of the laser beam or measurement beam caused by the saturable element has an extremum contrary to the saturation extreme value, i.e. a minimum or a maximum. For example, the saturable element may be fully saturated or be in a fully saturated state when the fluence impinging or incident on the saturable element has a value at which the modulation, i.e. transmission, absorption, reflection, diffraction and/or scattering of the laser beam or measurement beam caused by the saturable element has a maximum. Accordingly, the saturable element is fully unsaturated or is in a fully unsaturated state when the fluence impinging or incident on the saturable element has a value at which the modulation, i.e. transmission, absorption, reflection, diffraction and/or scattering of the laser beam or measurement beam caused by the saturable element has a minimum. Depending on the nature of the saturable element, it is also possible that the maximum is a minimum and vice versa.

For the purposes of this description, the fluence necessary for a saturated or fully saturated state of the saturable element will be referred to as a saturation fluence.

The fluence adjusting element may be a lens, a system consisting of a polarizer and an analyzer, or a density element. The fluence adjusting element may be arranged between the laser or beam splitter and the saturable element.

To ensure that the fluence of the individual pulses of the laser, which is incident on the saturable element, has a value that results in a substantially complete saturation of the saturable element, various methods can be applied. For example, the power of the measurement beam and thus its fluence can be influenced by a defined weakening of the measurement beam by means of a polarizer/analyzer or a density filter. A further possibility consists in the variation of the surface irradiated on the saturable element by the laser. This can for example be varied by either shifting the saturable element along the beam caustic or along the optical path of the laser beam, or by adjusting the beam caustic or the beam cross section of the measurement beam at the location of the saturable element by means of a focusing element, such as a lens or a mirror, such that the desired fluence, e.g. the saturation fluence is achieved. The fluence required for a complete saturation may also be determined from the ratio $P_{cw}/P_{puls}$ at the measurement setup. Due to the characteristic saturation behavior of the saturable element, for example, it is expected that the ratio $P_{cw}/P_{puls}$ in the fluence region of the complete saturation or at the saturation fluence has an extremum, i.e. a maximum or a minimum, since a maximum or minimum modulation of the laser beam or the measurement beam by the saturable element is achieved here. It depends on the type of saturable element used whether a maximum or a minimum is present.

If a lens arranged between the laser or beam splitter and the saturable element is used as the fluence adjusting element, for example, this lens can be shifted in the optical axis direction such that the ratio $P_{cw}/P_{puls}$ yields a minimum or maximum. Thus, the desired fluence can be easily adjusted.

By adjusting the fluence, a systematic measurement error by insufficient saturation of the saturable element can be avoided in an advantageous way.

In a further embodiment of the method, all steps up to and including determining the power proportion of the background radiation of the laser are repeated once or several times with a different saturable element each. To determine the overall result, averaging over the individual determined power proportions of the radiation background of the pulsed laser is performed. In other words, after determining the power proportion of the radiation background of the pulsed laser, the saturable element is replaced by another saturable element, and then the steps described above are repeated. All saturable elements may have known or experimentally determinable properties. Further, the properties of a saturable element may differ from the properties of the saturable element or the saturable elements previously used.

In this way, i.e. by the use of various saturable elements with different profiles of the saturation as a function of the fluence or with different modulation depths and/or different non-saturable losses as well as by multiple measurements and averaging, the measurement accuracy can be increased further.

In a further embodiment, the method includes the following step at the beginning of the method: calibrating or characterizing the saturable element or the saturable elements by means of a combined beam source, wherein the combined beam source comprises a cw laser with adjustable cw power and a pulsed laser with adjustable pulse power.

In particular, the adjustable cw power and pulse power may be mean powers. By the use of a known cw and pulsed source, the saturable elements can be calibrated. A calibration procedure may comprise one or more of the following steps: superposing, in particular coaxially superposing, a background radiation or cw radiation of the cw laser with a pulsed laser radiation of the pulsed laser. Superposing may be performed with a polarization beam splitter, for example, setting the power proportion of the background radiation or cw radiation emitted by the cw laser and/or the power proportion of the pulsed laser radiation emitted by the pulsed laser by adjusting the powers of the cw laser and/or the power of the pulsed laser.

With the aid of the combined beam source, the measurement setup can be qualified. In particular when the saturation characteristics of the saturable element are not precisely known, the setup or the saturable element may be calibrated or characterized.

The present disclosure further provides a device for quantitatively detecting or measuring the power proportion of a radiation background of a pulsed laser, including a saturable element for modulating a measurement beam of the laser impinging or incident on the saturable element, wherein the modulation of the measurement beam by the saturable element depends on the fluence of the measurement beam, a modulation beam power detector for detecting or measuring the power of the measurement beam modulated by the saturable element, and an evaluator for determining or calculating the power proportion of the radiation background of the pulsed laser on the basis of the power of the measurement beam modulated by the saturable element, which is detected by the modulation beam power detector.

"Modulation of a laser beam" as defined in this description is a transmission, absorption, reflection, diffraction and/or scattering of the laser beam. By the interaction of a laser beam with the saturable element, in particular the power of the laser beam is modified or modulated. Thus, the term "modulation" in particular includes a power modulation.

The modulation beam power detector may be a power measuring head or a photodiode, in particular a calibrated photodiode.

The evaluator may be a computer or microprocessor, with which the power proportion of the radiation background of the pulsed laser can be determined or calculated on the basis of the of the power of the measurement beam modulated by the saturable element, which is detected by the modulation beam power detector. The evaluator may also include a display device, such as a display or a screen, and/or an output device, such as a printer, to display or output the result, in particular the determined power proportion of the background radiation of the laser and/or further information, such as the total power of the laser and/or the ratio of the power of the background radiation and the pulse power of the laser.

The device according to the present disclosure or the measuring system according to the present disclosure is advantageously very compact and allows for a very simple quantitative detection or measurement of the power proportion of the radiation background both on newly developed pulsed laser systems and on pulsed laser systems already industrially applied.

In one embodiment of the device, the saturable element is designed such that the saturable element is in an unsaturated state in case of a fluence resulting from the radiation background of the measurement beam, and is in a saturated state in case of a fluence resulting from a pulse of the measurement beam.

In other words, the saturable element is designed to adopt the above-described states for the corresponding fluence occurring at or incident on the saturable element.

The saturable element may be designed such that the saturable element is in a substantially fully unsaturated state as a consequence of the radiation background of the measurement beam, and is in a substantially fully saturated state as a consequence of a pulse of the measurement beam.

In contrast to a pulse of the laser or measurement beam, a radiation background or a cw radiation of the laser or measurement beam is not limited in time. Nevertheless, the radiation background or the cw radiation produces no saturation or only a partial saturation of the saturable element. This is because in the continuous irradiation of the saturable element, a relaxation from the partially saturated state of the saturable element takes place as well. A balance between the continuous absorption of the cw radiation and this relaxation is established. This balance ultimately determines the saturation of the saturable element. Thus, a specific, finite fluence results from the radiation background of the laser or measuring radiation. For the purposes of this description, the fluence resulting from the radiation background of the laser or measuring radiation is also referred to as a cw balance fluence. For the purposes of this description, the fluence resulting from a pulse of the laser radiation is also referred to as a pulse fluence. Thus, in case of a fluence resulting from the radiation background of the measurement beam, the saturable element is preferably in a substantially fully unsaturated state, and in case of a fluence resulting from a pulse of the measurement beam, i.e. the pulse fluence, the saturable element is in a substantially fully saturated state. The pulse fluence may correspond to the saturation fluence. The cw balance fluence may be less than the saturation fluence.

In a further embodiment, the device according to the invention further includes a beam splitter for splitting the laser beam emitted by the laser into a reference beam and the measurement beam, a reference beam power detector for detecting or measuring the power of the reference beam; wherein the beam splitter is arranged and/or aligned such that the reference beam impinges on the reference beam power detector and the measurement beam impinges on the saturable element.

The reference beam power detector may include a power measuring head or a photodiode, in particular a calibrated photodiode. The beam splitter may include a known split ratio or an experimentally determinable split ratio. For example, the split ratio of the beam splitter is 50%. It is understood, however, that other values of the split ratio of the beam splitter are possible.

In a further embodiment, the saturable element is a saturable absorber, and in particular a saturable absorber mirror.

In a further embodiment, the device further includes a fluence adjusting element for adjusting the fluence of the measurement beam incident on the saturable element.

As described above, the fluence adjusting element may include a lens, a polarizer/analyzer and/or a density element.

The present disclosure further provides a saturable element, in particular a saturable absorber or a saturable absorber mirror, for quantitatively detecting the power proportion of a radiation background of a pulsed laser.

In the following, individual embodiments will be described by way of example with reference to the figures. Here, the individual embodiments described in part have features that are not mandatory for carrying out the claimed subject matter, but that provide desired properties in specific cases of application. Thus, embodiments not having all features of the embodiments described below should be considered to be disclosed as falling under the described technical teaching as well. Furthermore, certain features will only be mentioned in relation to individual embodiments described below in order to avoid unnecessary repetitions. It is pointed out that the individual embodiments should be considered not only on their own, but also in combination. On the basis of this combination, a person skilled in the art will recognize that individual embodiments may also be modified by including individual or several features of other embodiments. It is pointed out that a systematic combination of the individual embodiments with individual or several features described in relation to other embodiments may be desirable and expedient and should therefore be taken into consideration and also be considered to be comprised by the description.

DETAILED DESCRIPTION

Figure 1:
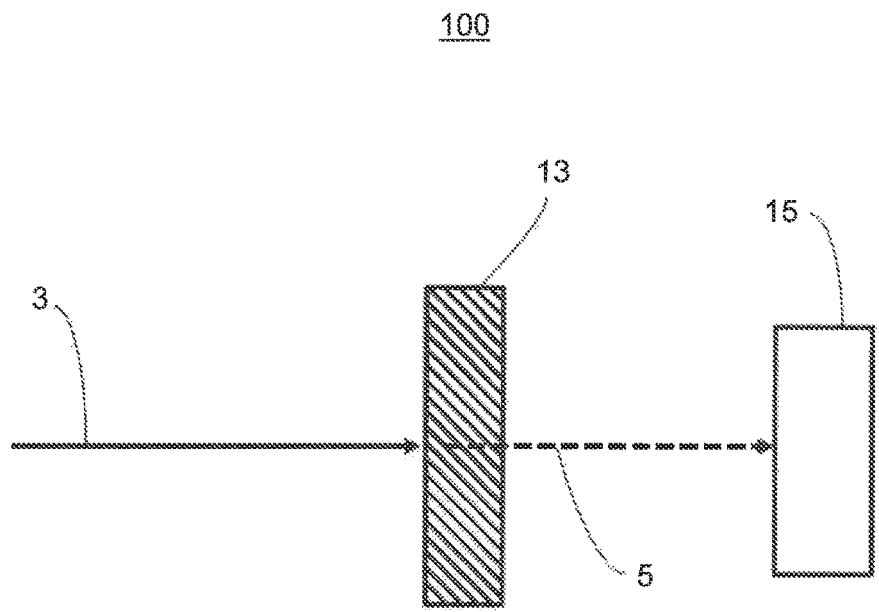
FIG. 1 shows a schematic drawing of a device according to an embodiment.

FIG. 1 shows a schematic drawing of a device 100 for quantitatively detecting the power proportion of a radiation background of a pulsed laser according to one embodiment. The device includes a saturable member 13, a modulation beam power detector 15, and an evaluator (not shown in FIG. 1). In the embodiment of FIG. 1, the saturable element is transmissive, i.e. it transmits an impinging or incident laser beam 3, wherein the power of the transmitted beam 5 compared to the incident beam 3 is modulated depending on the fluence of the laser beam 3 impinging or incident on the saturable element. Depending on the fluence of the impinging or incident laser beam 3, the power of the transmitted beam 5 differs from the power of the incident beam 3, which is also referred to as a measurement beam.

The laser beam or measurement beam 3 to be analyzed is propagated through the transmissive saturable element 13 and the power remaining in the modulated or transmitted beam 5 is measured by means of the modulation beam power detector 15, which in particular comprises a photodiode or a power measuring head.

Figure 2:
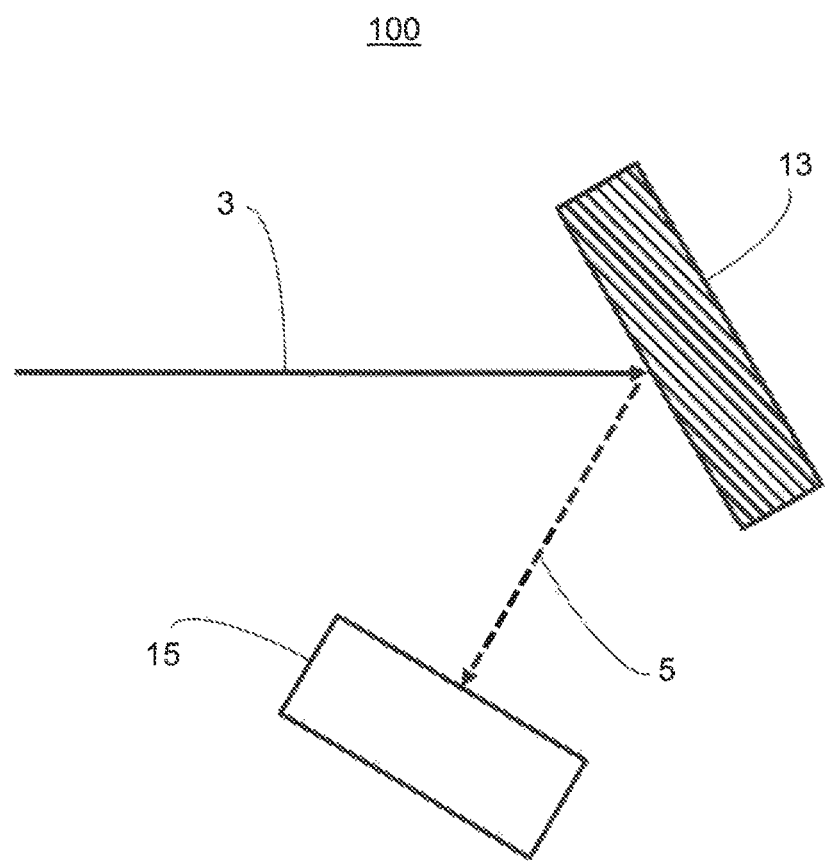
FIG. 2 shows a schematic drawing of a device according to another embodiment.

FIG. 2 shows a schematic drawing of a device 100 for quantitatively detecting the power proportion of a radiation background of a pulsed laser according to another embodiment. In the embodiment of FIG. 2, the saturable element is reflective, i.e. it reflects an impinging or incident laser beam 3, wherein the power of the reflected beam 5 compared to the incident beam 3 is modulated depending on the fluence of the laser beam 3 impinging or incident on the saturable element. Depending on the fluence of the impinging or incident laser beam 3, the power of the reflected beam 5 differs from the power of the incident beam or measurement beam 3.

The laser beam or measurement beam 3 to be analyzed is reflected by the saturable element 13 and the power remaining in the modulated or reflected beam 5 is measured by means of the modulation beam power detector 15.

The reflective saturable element may be a saturable absorber mirror. The modulation beam power detector 15 may include a photodiode or a power measuring head.

Figure 3:
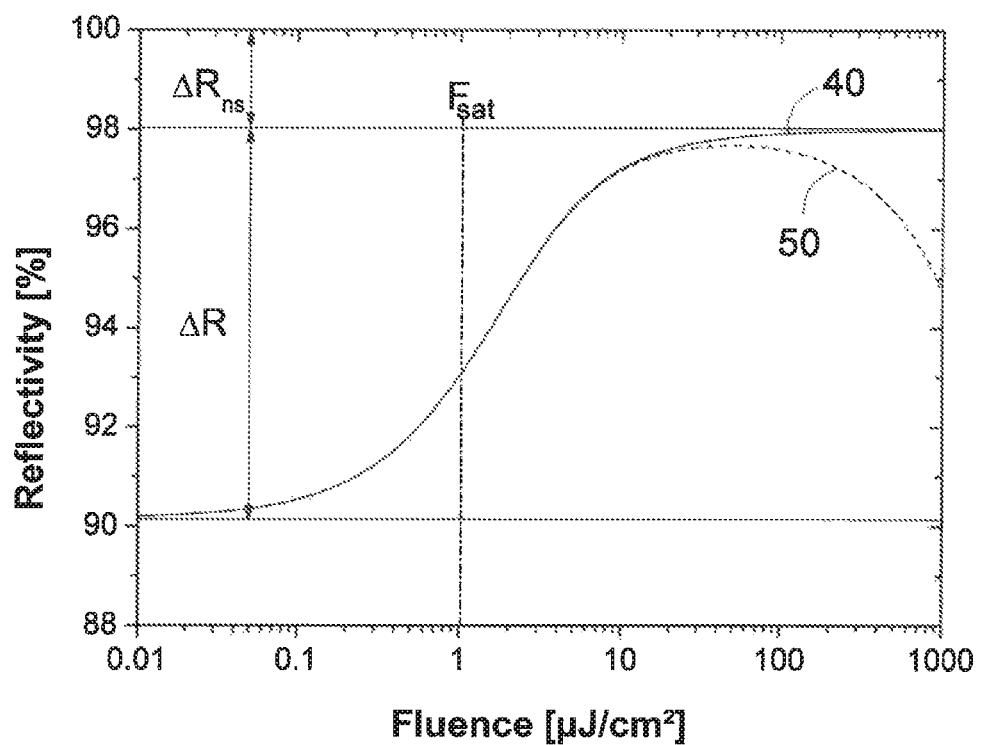
FIG. 3 shows an example profile of the reflectivity of a saturable absorber mirror as a function of the incident fluence.

FIG. 3 shows an example profile of the reflectivity of a saturable absorber mirror in dependence on the incident fluence. Here, the curve 40 shown in the diagram represents an ideal profile, whereas the curve 50 represents a real profile. In the fluence curve of the exemplary saturable element shown in FIG. 3, the degree of modulation or the reflectivity continuously increases as the fluence increases in the range of about 0.01 to 25 µJ/cm². While the reflectivity with the ideal curve 40 increases even in case of a fluence increase in the range of >25 µJ/cm², the reflectivity according to the real curve 50 decreases starting from about 25 µJ/cm². This decrease may in particular result from a two-photon absorption. The fluence range in which the degree of modulation or the reflectivity decrease again with the real curve 50 is referred to as a "roll-over" range.

As shown in the diagram of FIG. 3, the saturable element or its fluence curve is characterized by the modulation depth $\Delta R$ and by non-saturable losses $\Delta R_{ns}$. To achieve a high measuring accuracy, it is advantageous that the modulation depth be as great as possible and the non-saturable losses be as small as possible. $F_{Sat}$ in FIG. 3 designates a saturation fluence of the saturable element. As shown in FIG. 3, for example, this saturation fluence can be determined or specified by the turning point of the fluence curve. However, it is also possible to define the saturation fluence in a different way, for example as a fluence value between the turning point and the maximum of the fluence curve shown in the FIG. 3, or as a fluence value corresponding to the maximum of the fluence curve. With a fluence greater than $F_{Sat}$, the saturable element is substantially or fully saturated, i.e. is in a substantially or fully saturated state. Complete saturation of the saturable element is in particular the case at the maximum of the real curve 50, i.e. at about 50 µJ/cm² in the example of FIG. 3.

The transmissivity or reflectivity of the saturable element 13 of FIGS. 1 and 2 depends on the fluence, i.e. on the energy per unit area, of the laser pulse or laser beam 3. As the fluence dependence of the transmissivity or reflectivity of the saturable element 13 is known or can be determined experimentally, it is possible to calculate back to the power proportion of the laser pulses in relation to the cw background and/or to other noise by measuring the mean power $P_{Sat}$ of the transmitted or reflected laser beam 5. The incident measurement beam 3 has a power $P_{Ref}$, which is composed of the power of the radiation or cw background $P_{cw}$ and the mean power of the laser pulses $P_{puls}$:

$$P_{Ref} = P_{cw} + P_{puls} \quad (3) \rightarrow P_{cw} = P_{Ref} - P_{puls} \quad (3A).$$

The beam is transmitted through the saturable element 13 or reflected thereon, wherein a proportion $\Delta R_{ns}$ of the beam is absorbed by non-saturable losses. In the fully saturated state, the saturable element has a reflectivity or transmissivity increased by the modulation depth $\Delta R$. If the saturable element is substantially or fully saturated (see FIG. 3), this results in the power in the modulated beam 5 according to:

$$P_{Sat} = P_{cw}(1-\Delta R_{ns}-\Delta R) + P_{puls}(1-\Delta R_{ns}) \quad (4).$$

Inserting equation (3A) into equation (4) yields $P_{puls}$:

$$P_{Sat} = (P_{Ref} - P_{puls})(1 - \Delta R_{ns} - \Delta R) + P_{puls}(1 - \Delta R_{ns}) = \quad (5)$$
$$P_{Ref}(1 - \Delta R_{ns} - \Delta R) + P_{puls}\Delta R$$
$$\rightarrow P_{puls} = \frac{P_{Sat} - P_{Ref}(1 - \Delta R_{ns} - \Delta R)}{\Delta R}.$$

Inserting equation (5) into equation (3A) yields $P_{cw}$:

$$\rightarrow P_{cw} = P_{Ref} - \frac{P_{Sat} - P_{Ref}(1 - \Delta R_{ns} - \Delta R)}{\Delta R} = \frac{P_{Ref}(1 - \Delta R_{ns}) - P_{Sat}}{\Delta R}. \quad (6)$$

Thus, the ratio of the power of the radiation background and the pulse power results from:

$$\frac{P_{cw}}{P_{puls}} = \frac{P_{Ref}(1 - \Delta R_{ns}) - P_{Sat}}{P_{Sat} - P_{Ref}(1 - \Delta R_{ns} - \Delta R)} = \frac{(1 - \Delta R_{ns}) - \frac{P_{Sat}}{P_{Ref}}}{\frac{P_{Sat}}{P_{Ref}} - (1 - \Delta R_{ns} - \Delta R)}. \quad (7)$$

In case of a known overall power of the laser $P_{Ref}$ to be analyzed and with known values of $\Delta R$ and $\Delta R_{ns}$ of the saturable element 13 used, it is possible to determine the ratio of the power of the radiation background and the pulse power by measuring the power $P_{Sat}$ of the modulated measurement beam 5 according to equation (7).

Figure 4:
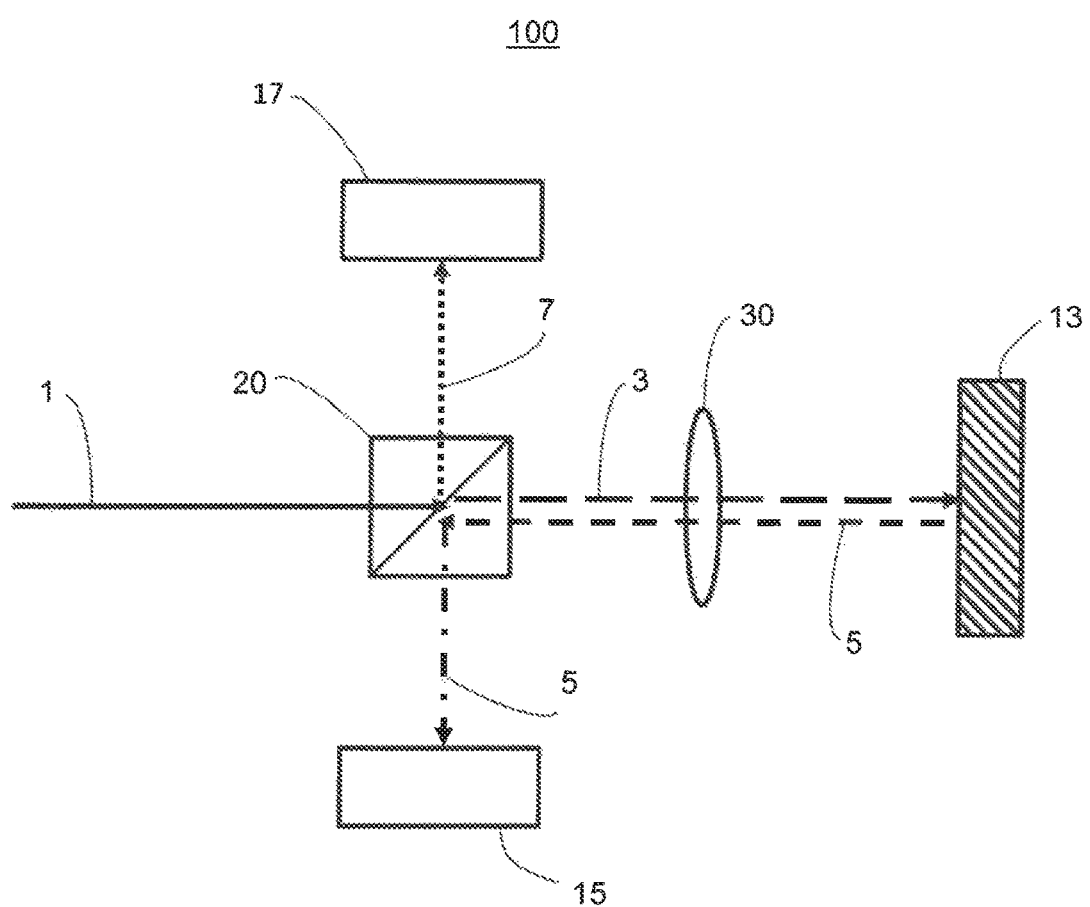
FIG. 4 shows a schematic drawing of a device according to another embodiment.

FIG. 4 shows a schematic drawing of a device 100 for quantitatively detecting the power proportion of a radiation background of a pulsed laser in accordance with another embodiment. In comparison to the embodiments of FIGS. 1 and 2, the device according to the embodiment of FIG. 4 additionally includes a beam splitter 20 and a fluence adjusting element or lens 30. The beam splitter 20 splits the laser beam 1 emitted by a laser into a measurement beam 3 and a reference beam 7. The measurement beam impinges on the saturable element or the saturable absorber mirror 13 and is modulated or reflected thereby. The modulated or reflected beam 5 will eventually be directed to a modulation beam power detector by means of the beam splitter 20, with which the power of the modulated beam is 5 measured. By means of a reference beam power detector 17, the power $P_{Ref}$ of the reference beam 7 is measured. As shown in FIG. 4, the beam splitter 20 may be a conventional beam splitter, which performs a splitting of the laser beam into power proportions.

According to FIG. 4, the laser beam 1 to be analyzed is split into the measurement beam 3 and the reference beam 7 by means of the beam splitter 20 with a known split ratio, for example with 50% of the power in each of the partial beams. Alternatively or in addition, the beam splitter 20 may be calibrated prior to the measurement e.g. by means of a highly reflective mirror disposed at the location of the saturable element 13.

The reflectivity of the saturable absorber mirror depends on the fluence of the measurement beam 3. Since this fluence dependence of the reflectivity of the saturable absorber mirror is known, it is possible to calculate back to the power proportion of the laser pulses in relation to the cw background and/or to other noise by measuring the mean power $P_{Sat}$ of the modulated or reflected laser beam.

If the reflectivity of the beam splitter 20 is designated with S, the power of the reference beam 7 is:

$$P_{Ref} = S(P_{cw} + P_{puls}) \quad (8).$$

It follows for the power $P_{cw}$ of the background radiation:

$$P_{cw} = \frac{P_{Ref}}{S} - P_{puls}. \quad (8A)$$

The power $P_{Sat}$ the modulated measurement beam 5 is:

$$P_{Sat} = S(1-S)[P_{cw}(1-\Delta R_{ns}-\Delta R) + P_{puls}(1-\Delta R_{ns})] \quad (9).$$

Inserting equation (8A) into equation (9) yields for the mean power $P_{puls}$ of the pulse radiation:

$$P_{Sat} = S(1-S)\left[\left(\frac{P_{Ref}}{S} - P_{puls}\right)(1-\Delta R_{ns}-\Delta R) + P_{puls}(1-\Delta R_{ns})\right] = \quad (10)$$

$$S(1-S)\left[\frac{P_{Ref}}{S}(1-\Delta R_{ns}-\Delta R) + P_{puls}\Delta R\right]$$

$$\rightarrow P_{puls} = \frac{\frac{P_{Sat}}{S(1-S)} - \frac{P_{Ref}}{S}(1-\Delta R_{ns}-\Delta R)}{\Delta R}.$$

Inserting equation (10) into equation (8A) yields for $P_{cw}$:

$$P_{cw} = \frac{P_{Ref}}{S} - \frac{\frac{P_{Sat}}{S(1-S)} - \frac{P_{Ref}}{S}(1-\Delta R_{ns}-\Delta R)}{\Delta R} = \quad (11)$$

$$\frac{\frac{P_{Ref}}{S}(1-\Delta R_{ns}) - \frac{P_{Sat}}{S(1-S)}}{\Delta R}.$$

Thus, the ratio of the power of the radiation background and pulse power results from:

$$\frac{P_{cw}}{P_{puls}} = \frac{\frac{P_{Ref}}{S}(1-\Delta R_{ns}) - \frac{P_{Sat}}{S(1-S)}}{\frac{P_{Sat}}{S(1-S)} - \frac{P_{Ref}}{S}(1-\Delta R_{ns}-\Delta R)} = \quad (12)$$

$$\frac{(1-\Delta R_{ns}) - \frac{P_{Sat}}{(1-S)P_{Ref}}}{\frac{P_{Sat}}{(1-S)P_{Ref}} - (1-\Delta R_{ns}-\Delta R)} = \frac{(1-S)(1-\Delta R_{ns}) - \frac{P_{Sat}}{P_{Ref}}}{\frac{P_{Sat}}{P_{Ref}} - (1-S)(1-\Delta R_{ns}-\Delta R)}.$$

With a known reflectivity S of the beam splitter 20 used and with known values of $\Delta R$ and $\Delta R_{ns}$ of the saturable element 13 used, the ratio of the power of the radiation background and the pulse power can be determined according to equation (12) by measuring the power $P_{Sat}$ of the modulated measurement beam 5 and by measuring the power of $P_{Ref}$ of the reference beam 7.

The saturable element 13 has a profile of the transmission/reflection that is dependent on the fluence (see FIG. 3). In order to avoid a systematic measurement error due to insufficient saturation of the saturable element 13, the fluence of the pulses to be measured and of the cw background can be adapted to the fluence curve of the saturable element 13. To this end, as shown in FIG. 4, an axially displaceable lens or lens 30 displaceable along the optical path may be used. This lens 30 is arranged between the beam splitter 20 and the saturable element 13. If the saturable element 13 is a saturable absorber mirror, for example, it can be guaranteed that the pulses saturate the saturable absorber mirror maximally. In this case, a saturation is achieved at a minimum of the ratio $P_{cw}/P_{puls}$.

For the above-described measurements it must be provided that the power of the radiation background, i.e. in particular the mean cw power of the laser to be analyzed is not sufficient to saturate the saturable element. In contrast, the saturable element must be saturated, and may be fully saturated for a pulse peak power. This condition is usually easily met for common pulsed lasers. This is because the peak power of an individual laser pulse is generally much higher than the mean power of the background radiation or the cw background of the laser. Thus, for example, a laser with a pulse duration of 5 ps, a repetition rate of 1 MHz, and a mean pulsed power of 50 W (mean total power of 100 W) has a pulse peak power of 10 MW. Thus, the cw background proportion is 50% of the mean total power of the laser. Hence, the peak power of a pulse is greater than the power of the cw background by a factor of $2 \cdot 10^5$. Based on this high power difference, the above-mentioned requirement can be met easily. For many pulsed laser systems to be measured an even greater difference between pulse peak power and mean power of the cw background can be expected, as the proportion of the cw background to the total power is typically much lower.

In the case of saturable elements having a "roll-over" range in the fluence curve (see FIG. 3), it is crucial to the measuring accuracy that the saturable element does not get into the roll-over range upon impingement of a laser pulse.

To avoid this, the fluence impinging on the saturable element 13 can be adapted or adjusted by means of the fluence adjusting element or the lens 30 shown in FIG. 4. By appropriately adjusting the fluence, i.e. by a suitably displacing the lens along the optical path between the beam splitter 20 and the saturable element 13, one can achieve that the saturable element 13 assumes an unsaturated state upon impingement of the radiation background, on the one hand. On the other hand, on can achieve that the saturable element 13 assumes a saturated state upon impingement of a laser pulse, without getting into the roll-over range.

The fluence required for a complete saturation can be determined from the ratio $P_{cw}/P_{puls}$ with the measurement setup or device 100 according to the invention. Due to the characteristic saturation behavior of the saturable element or saturable absorber mirror 13, for example, it is expected according to the exemplary curve of FIG. 3 that the ratio $P_{cw}/P_{puls}$ in the fluence region of the complete saturation (for the laser pluses) has a minimum, since here the maximum reflectivity of the saturable element or saturable absorber mirror 13 is achieved.

What is claimed is:

1. A method for quantitatively detecting the power proportion of a radiation background of a pulsed laser, the method comprising:
    modulating a measurement beam emitted by the laser using a saturable element, wherein the beam is modulated depending on a fluence of the measurement beam;
    detecting the power of the measurement beam modulated by the saturable element using a modulation beam power detector; and
    determining the power proportion of the radiation background of the pulsed laser based on the detected power, wherein the power proportion of the radiation background is the proportion of the radiation background to a mean pulse power of the pulsed laser over time.

2. The method according to claim 1, wherein the method comprises, prior to modulating the measurement beam,
    splitting a laser beam emitted by the laser into a reference beam and the measurement beam using a beam splitter, and wherein prior to the determining the power proportion, the method further comprises
    detecting the power of the reference beam using a reference beam power detector.

3. The method according to claim 2, wherein prior to detecting the power, the method further comprises:
    adjusting the fluence of the measurement beam occurring at the saturable element using a fluence adjusting element such that the saturable element is in an unsaturated state as a consequence of the radiation background of the measurement beam, and in a saturated state as a consequence of a pulse of the measurement beam.

4. The method according to claim 2, wherein modulating, detecting, and determining are repeated at least once with another saturable element, and wherein averaging over the determined power proportions of the radiation background of the pulsed laser is performed.

5. The method according to claim 2, further comprising, at the beginning of the method:
    calibrating the saturable element using a combined beam source, wherein the combined beam source includes a cw laser with adjustable cw power and a pulsed laser with adjustable pulse power.

6. The method according to claim 1, wherein prior to detecting the power, the method further comprises:
    adjusting the fluence of the measurement beam occurring at the saturable element using a fluence adjusting element such that the saturable element is in an unsaturated state as a consequence of the radiation background of the measurement beam, and in a saturated state as a consequence of a pulse of the measurement beam.

7. The method according to claim 6, wherein modulating, detecting, and determining are repeated at least once with another saturable element, and wherein averaging over the determined power proportions of the radiation background of the pulsed laser is performed.

8. The method according to claim 6, further comprising, at the beginning of the method:
    calibrating the saturable element using a combined beam source, wherein the combined beam source includes a cw laser with adjustable cw power and a pulsed laser with adjustable pulse power.

9. The method according to claim 1, wherein modulating, detecting, and determining are repeated at least once with another saturable element, and wherein averaging over the determined power proportions of the radiation background of the pulsed laser is performed.

10. The method according to claim 9, further comprising, at the beginning of the method:
    calibrating the saturable element using a combined beam source, wherein the combined beam source includes a cw laser with adjustable cw power and a pulsed laser with adjustable pulse power.

11. The method according to claim 1, further comprising, at the beginning of the method:
    calibrating the saturable element using a combined beam source, wherein the combined beam source includes a cw laser with adjustable cw power and a pulsed laser with adjustable pulse power.

12. A device for quantitatively detecting the power proportion of a radiation background of a pulsed laser, the device comprising:
    a saturable element for modulating a measurement beam of the laser incident on the saturable element, wherein the modulation of the measurement beam by the saturable element depends on the fluence of the measurement beam;
    a modulation beam power detector for detecting a power of the measurement beam modulated by the saturable element; and
    an evaluator for determining the power proportion of the radiation background of the pulsed laser based on the power of the measurement beam detected by the modulation beam power detector, wherein the power proportion of the radiation background is the proportion of the radiation background to a mean pulse power of the pulsed laser over time.

13. The device according to claim 12, wherein the saturable element is designed such that the saturable element is in an unsaturated state as a consequence of the radiation background of the measurement beam, and is in a saturated state as a consequence of a pulse of the measurement beam.

14. The device according to claim 13, further comprising:
    a beam splitter for splitting the laser beam emitted by the laser into a reference beam and the measurement beam;
    a reference beam power detector for detecting the power of the reference beam;
    wherein the beam splitter is at least one of arranged and aligned such that the reference beam impinges on the reference beam power detector and the measurement beam impinges on the saturable element.

15. The device according to claim 13, wherein the saturable element is a saturable absorber.

16. The device according to claim 13, further comprising:
a fluence adjusting element for adjusting the fluence of the measurement beam incident on the saturable element.

17. The device according to claim 12, further comprising:
a beam splitter for splitting the laser beam emitted by the laser into a reference beam and the measurement beam;
a reference beam power detector for detecting the power of the reference beam;
wherein the beam splitter is at least one of arranged and aligned such that the reference beam impinges on the reference beam power detector and the measurement beam impinges on the saturable element.

18. The device according to claim 17, wherein the saturable element is a saturable absorber.

19. The device according to claim 12, wherein the saturable element is a saturable absorber.

20. The device according to claim 12, further comprising:
a fluence adjusting element for adjusting the fluence of the measurement beam incident on the saturable element.

* * * * *